Nov. 8, 1938.                R. M. R. COURTOIS-SUFFIT                2,136,181
                              LINE AND ALTITUDE DELINEATOR
                                   Filed June 5, 1936
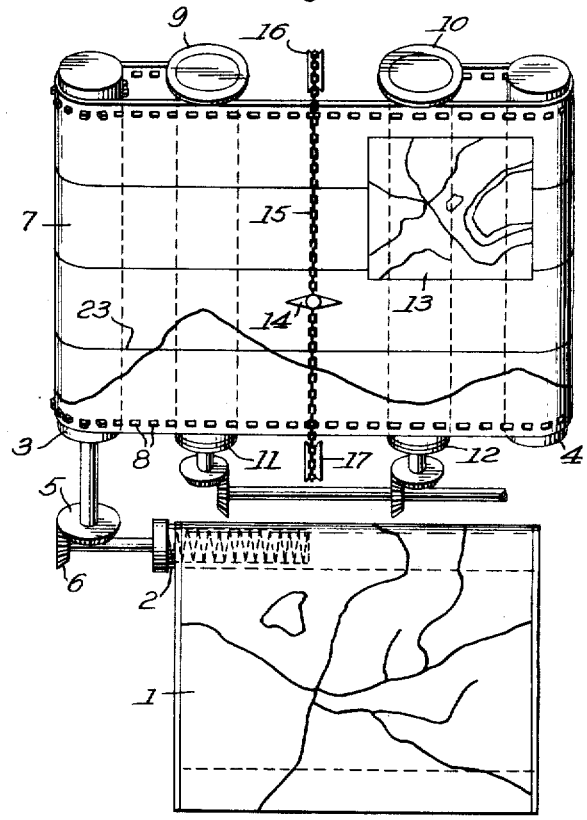
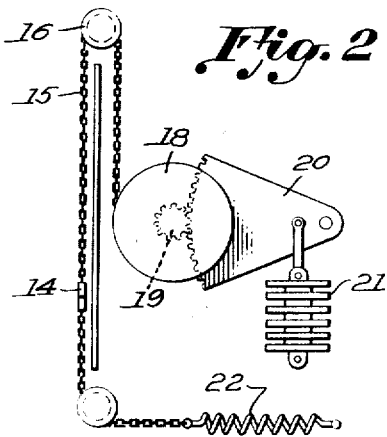
Inventor:
ROGER MAURICE ROBERT COURTOIS-SUFFIT.
By
                Attorneys.

Patented Nov. 8, 1938

2,136,181

UNITED STATES PATENT OFFICE 2,136,181

LINE AND ALTITUDE DELINEATOR

Roger Maurice Robert Courtois-Suffit, Paris, France

Application June 5, 1936, Serial No. 83,798
In France June 8, 1935

3 Claims. (Cl. 40—42)

The present invention relates to a line and altitude delineator appparatus and is intended to be added to an ordinary road delineator by means of which airplanes are guided as to point of compass, speed and wind-speed, the said apparatus indicating at all times the line of altitude over which the plane is flying, thus allowing the pilot to steer free of any obstacles, and in case of a breakdown or of fog will allow him to steer the plane towards even ground and to come down without danger. Moreover it is interesting to be able to study from time to time the configuration of the most important points over which the plane is flying. The embossed maps consist generally only a single line, and are more or less incomplete, and therefore it is possible to place on these maps scale photographs and line tracing representing the principal spots and to make notes as to the configuration of the ground available for coming down. Such notes are of great importance.

The apparatus described in the present invention is characterized especially in that the roll giving the map of relative altitude is unitary with that which gives the map of the horizontal projection of the line, and that each point disposed in the axis of the line of the map representing this horizontal projection is corresponding to a point on the map representing the line of altitude. This apparatus is therefore a real three way delineator. The line of altitude may be made to synchronize with the horizontal delineator of any known route tracer.

It will be understood that the pilot must keep the general axis of the line, and that the line of altitude on the roll must correspond to this axis. However one may trace lines parallel to this general axis and make the lines of altitude on the roll correspond to these. All that is necessary will be to trace lines of a different colour.

Moreover an altimeter may be added to the apparatus which will displace an index parallel to the line of the map of direction. This index will materialize the position of the airplane as to height and allow the pilot, by comparing this with the altitude line of the map, to control at all times the safety of his flight with regard to terrestrial obstacles.

Another important application of this apparatus is its adaptability to a shoot sight for bombardment.

The unfolding of the horizontal map and, consequently, that of altitude, is effected with the moving of the line tracer and proportionally with the absolute speed of the airplane incorporated with the speed of the wind direction, and on the other hand the position of the plane being represented above the earth, it follows that it becomes possible to determine the bends, either as traced on the map or projected upon it as a screen of which the inferior extremity touches a predetermined point on the index representing the plane at the exact height at the moment of shooting.

The meeting of the index and the bend will denote the precise moment at which the projectile should be released.

The scale must of course be sufficiently large in this case to ensure absolute precision and the setting of the map as to the points about to be flown over must be carefully done at short distance.

The annexed drawing is given only as an example:

Fig. 1 is a perspective view of the apparatus according to my present invention;

Fig. 2 is a view of the altimeter.

In the construction illustrated 1 is the map of the line delineator representing the horizontal projection and which is placed on the rolls 2 of which one only is represented; 3 and 4 are the rolls of the map giving the lines of altitude.

Roll 2 transmits its movement to roll 3 by means of two conical gear wheels 5 and 6.

Roll 3 drives map 7 by means of a serrated plate with perforations such as used on films.

The map is contained in two coils 9 and 10 which constantly tend to stretch it by means of a group of friction plates 11 and 12 driven by the motor and held by a spring, placed preferably inside the coil or roller and set in such a way that the slipping due to the resistance of the map will be balanced, keeping it tight without undue effort. 13 is a photograph or drawing representing on a large scale a remarkable point of the flight. 14 is the index representing the airplane and this index is fixed to a small cable or chain 15 passing over two pulleys 16 and 17. This cable 15 rolls round a large pulley 18 driven through the intermediary of a gear 19 meshing with a toothed section 20 rotated by the aneroid battery 21. The other end of the cable 15 is fixed to the retractive spring 22. A graduation of horizontal lines such as 23, conveniently spaced on the map or transparent sheet, permits the evaluation of the height of the plane and the relief of the land.

The modus operandi of the apparatus is as follows:

The unrolling of the map 7 follows exactly that of the map 1 and thus represents at all times the absolute speed of the plane when the pilot carefully follows the axis of the route, the index being displaced in relation to altitude and under the influence of the expanding of the barometric cells.

It is to be understood that the preceding is given as an example.

The delineator of horizontal projection and the route tracer in altitude may be disposed in different ways and not necessarily at right angles. They may also be placed on the same line or even on the same map.

The maps may be on dull and transparent material permitting the illumination or the projection of the tracings or pictures.

The index representing the airplane may also be projected on the map by means of appropriate lights.

The line of altitude or the photos and drawing, etc., may be presented on different maps. It will also be understood that the altitude roll may be used without the use of an altimeter.

Having now particularly described my invention what I claim as new and desire to protect by Letters Patent is:

1. In a route tracer for aircraft, a route map having thereon a route profile, means for moving said map proportionately to the speed of the aircraft, an altimeter, and index means operable by said altimeter for movement over said map relative to said route profile to indicate altitude.

2. In a route tracer for aircraft, a route map assembly carrying on a portion thereof a route profile, means for moving said map assembly proportionately to the speed of the aircraft following the route, an altitude index movable relatively to said route profile in a direction perpendicular to the route profile axis, and barometric pressure controlled means in operative connection with said index to move the same.

3. In a route tracer for aircraft, a traveling route map having on a porton thereof a route profile, means for moving said map proportionately to the route travel speed of the aircraft, a carrier movable across the map face in a plane perpendicular to a plane representing the horizontal axis of said route profile, an index on said carrier, and altimeter operated means for moving said carrier to shift said index according to altitude of the aircraft.

ROGER MAURICE ROBERT
COURTOIS-SUFFIT.